(No Model.) 5 Sheets—Sheet 1.
F. DANZENBAKER.
BEE HIVE.
No. 402,002. Patented Apr. 23, 1889.
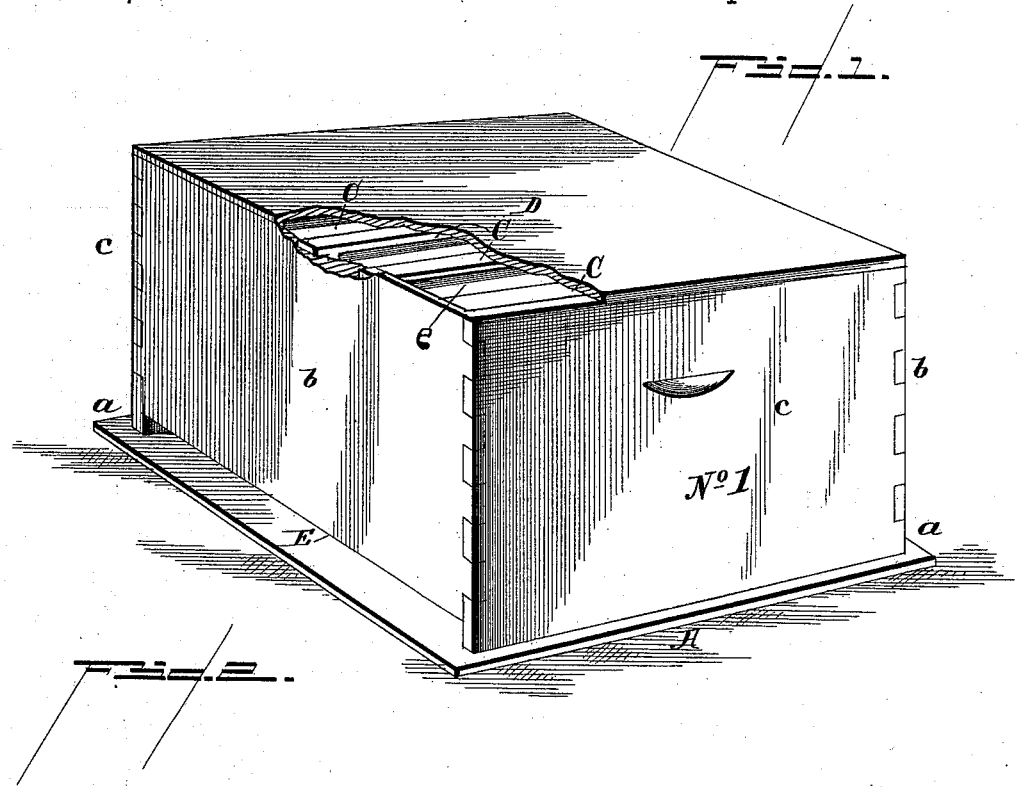
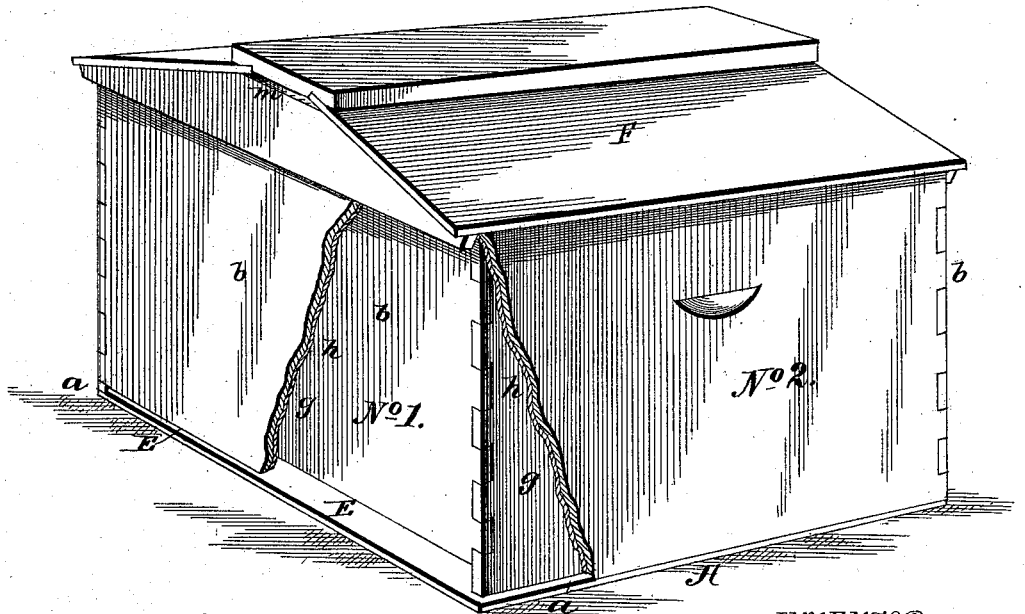

(No Model.) 5 Sheets—Sheet 2.
F. DANZENBAKER.
BEE HIVE.
No. 402,002. Patented Apr. 23, 1889.
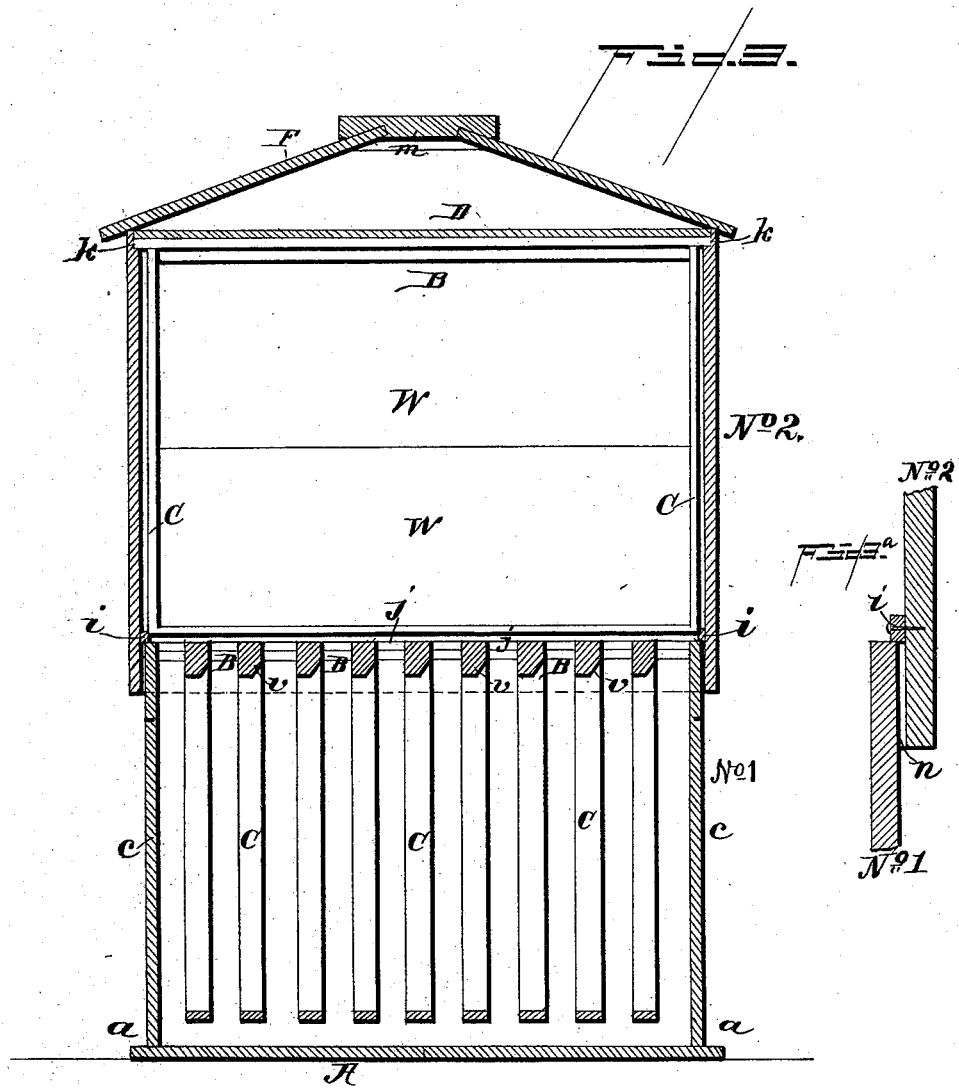

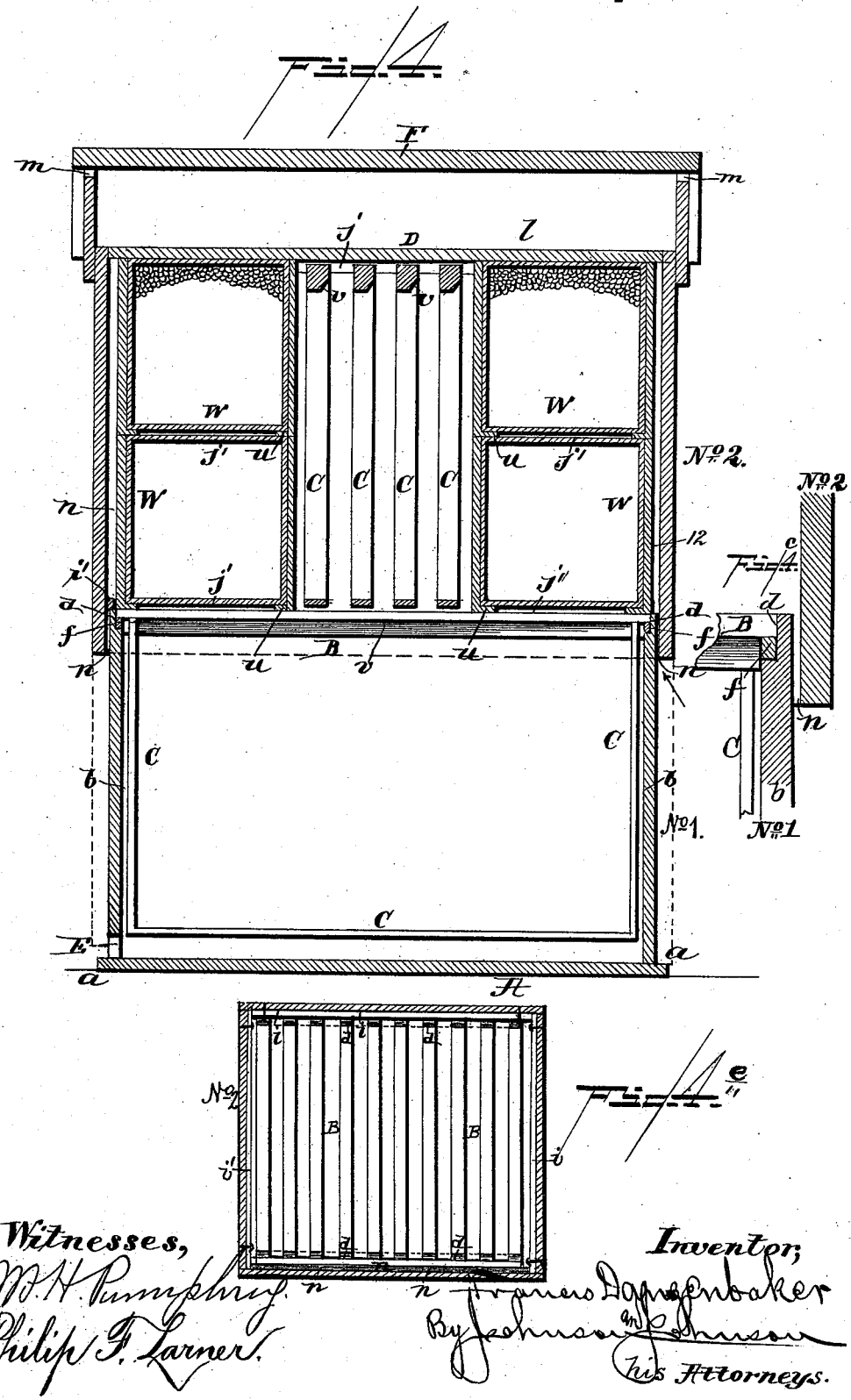

(No Model.) 5 Sheets—Sheet 4.
F. DANZENBAKER.
BEE HIVE.
No. 402,002. Patented Apr. 23, 1889.
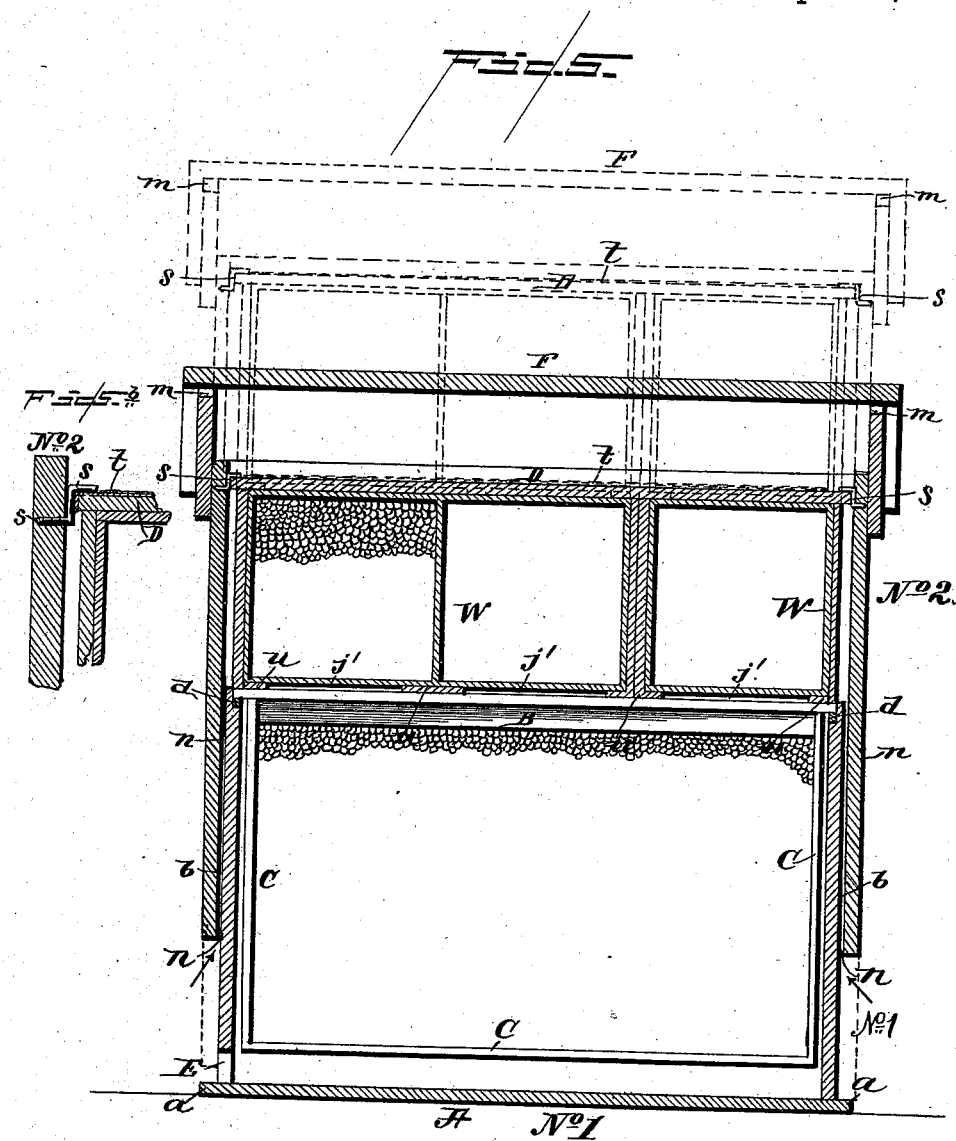
WITNESSES,
M. H. Pumphrey.
Philip F. Larner.
INVENTOR
Francis Danzenbaker
By Johnson & Johnson
his Attorneys.

(No Model.) 5 Sheets—Sheet 5.
F. DANZENBAKER.
BEE HIVE.
No. 402,002. Patented Apr. 23, 1889.
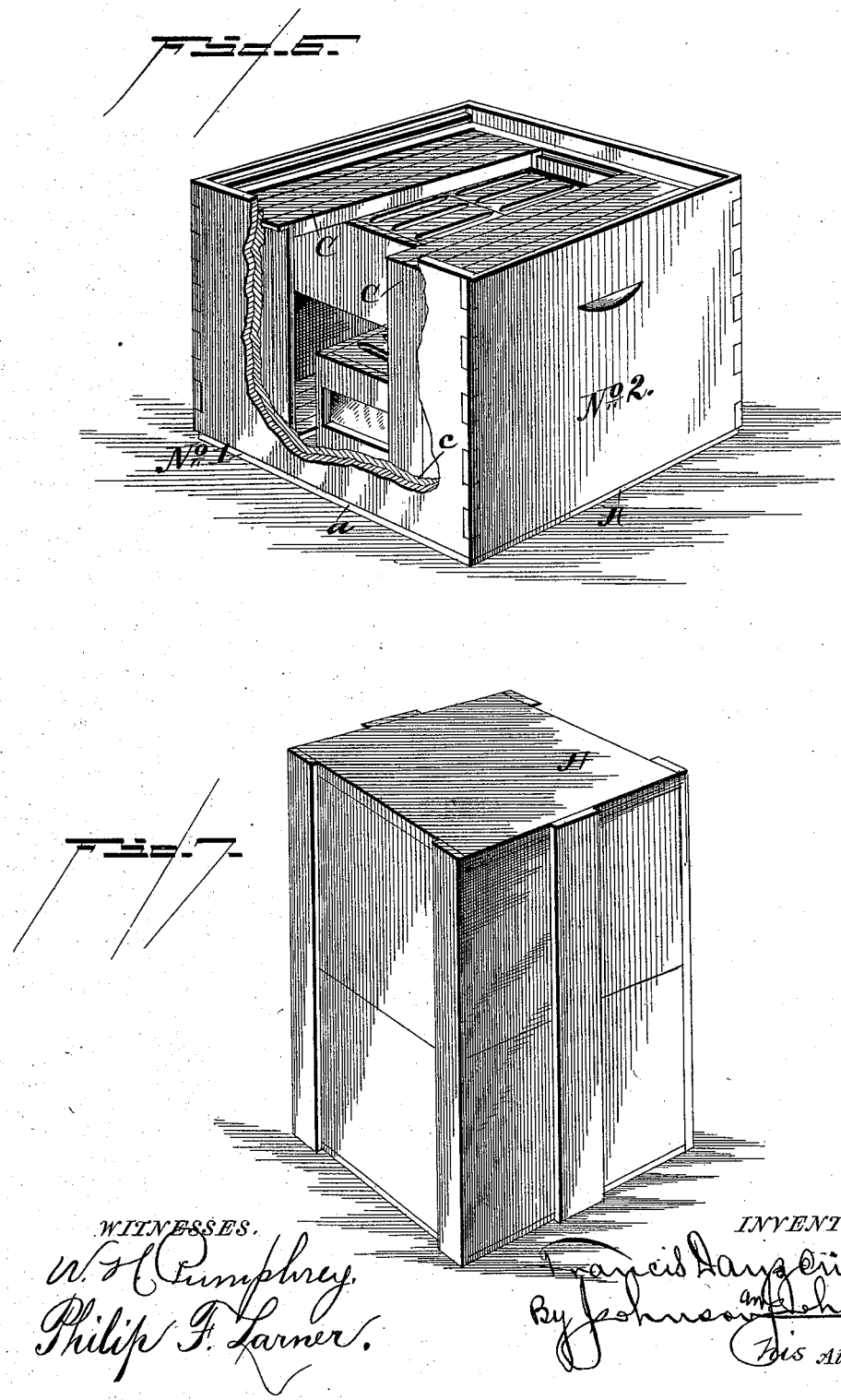

UNITED STATES PATENT OFFICE.

FRANCIS DANZENBAKER, OF CLAYMONT, DELAWARE.

BEE-HIVE.

SPECIFICATION forming part of Letters Patent No. 402,002, dated April 23, 1889.

Application filed August 17, 1888. Serial No. 282,995. (No model.)

*To all whom it may concern:*

Be it known that I, FRANCIS DANZENBAKER, a citizen of the United States, residing at Claymont, in the county of New Castle and State of Delaware, have invented new and useful Improvements in Bee-Hives, of which the following is a specification.

In a patent granted to me December 20, 1887, No. 375,269, I have shown, described, and claimed, among other things, a bee-hive adapted to be divided or converted into three different forms of a hive each capable of holding the same size of brood-frames, whereby the capacity of the hive could be increased, as might be desired, either by separate hives or by a single hive having a second story.

My present improvements are designed to attain the same objects by an improved construction and adaptation of two bodies, one of which can be adjusted upon and to envelop the other.

My present improvements are directed to a more simple construction and an easier handling of the separate hive-bodies in their various adjustments to increase the capacity and working of the hive. Proper ventilation is made for the hive when its capacity is increased by a second story. Provision is made for reducing the weight and bulk of the hive when made up ready for use. Provision is made for compactness for transportation (as boxed lumber) at a saving of about two hundred per cent. in freight charges. Provision is made for using the same brood-frames in either story of the hive. Provision is made for using the second story as a casing-cap for a single or double tier of surplus sections, and for both surplus crates and brood-frames at the same time, if desired. Provision is made for using the outer casing-cap as a distinct hive by having extra brood-frames, thus dispensing with the necessity of keeping extra hives for emergencies. Provision is also made for using the outer casing-cap for a brood-chamber with perfect protection against winter, and avoiding expense and care of bee rooms and cellars.

The two casing parts, bodies, or hives which I use for my improved single or double hive I will, for convenience, designate as Nos. 1 and 2, and it will be understood that they are so proportioned that while one can be used as a covering casing-cap for the other they are both of such dimensions that a full set of surplus crates filled with sections having the usual foundation and full sets of brood-frames ready for use may be easily packed inside the brood-chamber part No. 1 for shipment.

The construction and manner of adapting various parts of the hive to each other, by means of which I obtain the above objects, are illustrated in the accompanying drawings, and the precise improvement in such construction will be specifically embraced in the claims concluding this specification.

Figure 1 is a perspective view of body No. 1, which forms the brood-hive. Fig. 2 is a perspective view of the brood-hive No. 1, inclosed within body No. 2 as used in winter, part of hive No. 2 being broken away. Fig. 3 is a vertical cross-sectional view of my improved hive as used for box-honey, in which the outer body, No. 2, is shown as raised and supported upon body No. 1 to accommodate two tiers of crates, and also comb-frames, as shown in Fig. 4. Fig. 3ª is a sectional detail showing the removable cleats $i$ for supporting body No. 2 in raised position upon body No. 1. Fig. 4 is a section taken at right angles to Fig. 3, showing the means of ventilating around the crates and frames in the upper story. Fig. 4ᶜ is a sectional detail showing the removable rabbet-strips $f$ for supporting the brood-frames flush with the top of body No. 1. Fig. 4ᵉ is a horizontal section taken through body No. 2 just above the cleats $i\ i$, by which it is supported upon the top edge of No. 1, as in Fig. 3. Fig. 5 is a vertical longitudinal sectional view showing the outer body, No. 2, as suspended upon the lid which covers the crates therein, whereby the said body No. 2 may be suspended at heights as may be needed for one or two tiers of crates, the position for two tiers being shown in dotted lines. Fig. 5ᵇ is a sectional detail showing the suspending-hooks S for body No. 2. Fig. 6 is a perspective view showing the two bodies Nos. 1 and 2 and the crates containing the sections and brood-frames as packed for shipment, the gable roof being removed to expose the packing; and Fig. 7 shows the manner of packing two double or complete hives for shipment.

The body No. 1 constitutes the brood-chamber, and is made of lumber half an inch thick, with a bottom, A, projecting beyond the body all round to form a seat or rest, a, for the body No. 2, as shown in Fig. 2. The body No. 1 is joined together by lock-corners, which secures uniformity in shape, size, and strength. The ends b are about two inches shorter crosswise than the sides c, for a purpose to be presently stated, and are rabbeted on their upper inner edges at d d to receive the arms of the top bars, B, of the brood-frames C, as shown in Fig. 4ᶜ. These rabbets d are made sufficiently deep to receive the arms of the said top bars and to form a space, e, Fig. 1, above them and below the top edge of the body No. 1, to permit the bees to pass readily from one brood-frame to another beneath the cover or lid D of the brood-hive, as shown in Fig. 1, in which a portion of the lid D is shown broken away to expose said bee-space. This body No. 1 being thus covered, and having the top space, e, above the frames, makes a complete brood-chamber or hive, as seen in Fig. 1. The bee-entrance E extends entirely across the end or front of the hive, so as to give free ventilation to all the brood-frames which are arranged endwise toward the front of the hive.

The body No. 2 is made plain, and also, like body No. 1, is joined by lock-corners without top or bottom, and is large enough to be passed readily over the body No. 1 and rest, except at its front edge, on the projecting bottom of the latter, as seen in Fig. 2, for winter use, as I shall presently explain. This body No. 2 is provided on its inner walls near its lower edge with cleats i, two or more, (see Figs. 3, 3ᵃ, and 4,) placed the proper distance from the top of said body, whereby it is supported on the upper edge of body No. 1 and far enough above it to support brood-frames within No. 2, so as to leave space j between the upper and the lower sets of frames and crates, W.

The upper edge of the sides of body No. 2 is rabbeted at k, Fig. 3, to receive the same size of frames that are used in body No. 1, but are arranged at right angles to each other in the two bodies. By this construction and arrangement of the rabbets d and k of the two bodies the brood-frames cross each other, and are adapted to be used interchangeably in the two bodies, thereby requiring only one size of brood-frames for the two bodies.

When I want to use the two bodies to form a two-story hive, the lid or cover D, Fig. 1, is removed and supplemental rabbet-strips f f are placed within the rabbets d d to raise the top bars, B, of the brood-frames level with the top of the body No. 1, as seen in Fig. 4ᶜ, when body No. 1 will receive and support body No. 2 upon it. When the hive is thus used as a two-story hive, it can contain twenty brood-frames. I may, however, use within the second story a less number of frames and place therein also crates of sections, or fill it entirely with crates. In such disposition I may use twenty-eight sections and thirteen brood-frames; or I may use sixteen brood-frames and fourteen surplus sections at the same time.

When the hive is used, as shown in Fig. 4, as a complete working-hive, there is a bee-space, j, formed at the top of each body Nos. 1 and 2 above the top bars of the frames for the passage of bees from the frames of body No. 1 to the frames and sections above in body No. 2, while at the top of the latter the bee-space j is formed by a lid, l, under which the bees pass freely over the bars and do not gum them to the lid, as when a mat is used to cover the frames. To complete this hive, the roof F is placed upon it. This roof is a plain gable roof having openings m for ventilation at each end.

In the two-story hive the parts are purposely made of such dimensions that there is a space, n, left at one or at both ends for ventilation, (see Figs. 4 and 5,) in which case the air entering such space passes up under the lower edge of body No. 2 and out at the openings m under the roof, thereby giving a constant circulation of air around the honey-crates when desired. A simple adjustment or movement to the front or to the rear of body No. 2 upon its side cleats, i, will close one of these end openings, n, whereby the temperature can be in part regulated in the upper story; but, if desired to close the opening or openings n entirely, a strip, i', can be laid over the same or secured in such relation, as in Fig. 4.

When I want to use the hive exclusively for box-honey, I set section-crates W directly upon the brood-frames of body No. 1, with the sections in line with the brood-frames, and cover the crates with the lid D of body No. 1, as seen in Fig. 5. Body No. 2 is now passed over, so as to envelop the upper portion of body No. 1 and the honey-crates therein. In this position body No. 2 is suspended upon the lid D above the honey-crates by means of suitable suspending-hooks, s, or other supports set into the inner walls at the upper edge of the ends of body No. 2 and resting with their ends upon the ends of the lid D, Fig. 5.

A covering of newspapers, t, or other suitable material, can be placed upon the lid D to retain the warmth of the colony in the crates. This warmth-retaining covering may entirely cover the top of the body No. 2, so as to close the top of the air-spaces n between the two bodies; or it may be folded smaller, so as to leave the air-spaces open at the top of body No. 2 to permit free circulation of air between the bodies, and also between body No. 2 and the crates which it incloses. The body No. 2 is sufficiently deep to allow it to be raised to inclose two tiers of crates at the same time, if desired. When so used, the hive is covered by the gable roof, as seen in Fig. 4.

In my complete hive I dispense with the use of honey-boards over the brood-frames by using surplus crates, between the sections of which and the top bars of the brood-frames there is a bee-space, $j'$. (See Fig. 5.) This bee-space is made by supporting the sections upon the cleats $u$, nailed to the lower edges of the crates, so as to raise the sections the proper distance above the bars.

I use open end brood-frames with top bars seven-eighths of an inch square and beveled on one side at $v$, Fig. 3, to the center of its under side, the ends of the beveled part being cut away to receive the end pieces, C. This thickness of top bar prevents the sagging of the frame, and, used in connection with the bee-space $j'$ of the honey-crates, obviates the necessity of a honey-board.

Referring to Fig. 2, in which the body No. 1 is fully enveloped by body No. 2 for winter use, a space, $g$, is formed between the two bodies all round, which space can be filled with paper, $h$, or other suitable material, the object of which is to retain the natural warmth of the colony. To prepare this enveloped hive for winter, the honey-crates are removed and the flat lid or cover D is placed upon body No. 1, leaving the bee-space $e$ between it and the brood-frames. When I use a lid of wood, it is treated with a preparation of oil and paraffine to prevent it from warping or splitting and to deter the bees from building wax between it and the top bars. Preferably I use a lid made of vulcanized paper or indurated fiber treated in the same way as a better non-conductor of heat, and not so liable to collect moisture. Over the lid and down over the sides and ends of body No. 1 I place paper, $h$, (seen in Fig. 2,) of suitable thickness, so as to envelop the whole of body No. 1, except the entrance for the bees. Over this paper covering I pass body No. 2 until it rests upon the projecting bottom of No. 1. This partially closes the bee-space E, so as to leave only a normal bee-passage for winter, as seen in Fig. 2, in order to exclude cold, wind, snow, and rain. This normal bee-passage is formed by shortening the depth of the front end, $b$, of body No. 2, so that it only half closes the full bee-space seen in Fig. 1, as seen in dotted line in Fig. 5, when body No. 2 rests on the projecting bottom $a$ of body No. 1. The gable roof is now put on and projects over the body, so as to render the hive perfectly dry. The sides of body No. 2 project beyond the bottom sufficiently to shed rain clear of the same.

I may use body No. 2 as a separate and distinct hive by merely providing extra brood-frames and a bottom board.

I have stated that body No. 1 is about two inches longer than it is wide, and it is this construction that permits the use of brood-frames of one and the same size in each body—that is to say, by using them lengthwise in body No. 1 and crosswise in body No. 2, in which latter case the length crosswise is just the same as the length lengthwise in body No. 1.

Referring to the side cleats, $i$, by which body No. 2 is supported in the second-story hive, it will be understood that they are removably fastened on the sides. At the rear end there is no cleat $i'$, as shown in Fig. 4. Therefore an opening, $n$, may be created at this end of the hive or not, as may be desired, by sliding body No. 2 upon its supporting-cleats. It will also be seen that the cleats $i$ may be fixed at different heights from the bottom of body No. 2 for the purpose of supporting body No. 2 at any desired height upon body No. 1. It will also be understood that instead of suspending body No. 2 by the hooks $s$ it may be suspended in the position shown in Fig. 5 by the cleats, if desired.

The two body parts are so proportioned in relation to each other that in packing for shipping No. 2 fits compactly over body No. 1, and is secured by nails in each end, and the gable roof is also secured in its place by nails to the body No. 2. The crates filled in with sections provided with the usual foundation and the brood-frames are all made up ready for use and can be compactly stored within body No. 1, as seen in Fig. 6. By this means I am enabled to reduce the bulk of a beehive one-half, and in that proportion also the rate of freight. I may also pack and ship two of these double hives together with all the parts inclosed, as shown in Fig. 7.

I claim as my improvement—

1. The combination of body No. 1, consisting of the brood-chamber, with body No. 2, consisting of a casing open at the top and at the bottom enveloping said body No. 1, the dimensions of the two bodies being such that a space, $n$, is left between said bodies, the cleats $i$ on two of the sides of the inner walls of body No. 2, and a cleat or cleats, $i'$, arranged over said space or spaces, whereby said body No. 2 may be adjusted to close said spaces or to leave one of them open for ventilation, substantially as described.

2. The combination of body No. 1, consisting of the brood-chamber having the upper edges of its ends $b$ $b$ rabbeted at $d$, the removable strips $f f$, fitted in said rabbets, and comb-frames having their bars supported upon said strips, with body No. 2, consisting of a casing open at the top and at the bottom provided with comb-frames and section-crates and supported upon said top bars, so as to leave the bee-space $j'$, as described.

In testimony whereof I have hereunto set my hand in the presence of two subscribing witnesses.

FRANCIS DANZENBAKER.

Witnesses:
A. E. H. JOHNSON,
GEO. A. HOWARD.